United States Patent [19]

Spengler

[11] Patent Number: 5,324,384
[45] Date of Patent: Jun. 28, 1994

[54] APPARATUS FOR LAMINATING A TRIM PANEL AND FOLDING A BRIM AROUND THE PANEL RIM

[75] Inventor: Gerhard Spengler, Frankfurt, Fed. Rep. of Germany

[73] Assignee: R & S Stanztechnik GmbH, Offenbach Bieber Waldhof, Fed. Rep. of Germany

[21] Appl. No.: 996,901

[22] Filed: Dec. 23, 1992

[51] Int. Cl.$^5$ ............... B32B 31/20; B30B 5/00
[52] U.S. Cl. ............... 156/581; 156/227; 156/583.1
[58] Field of Search ............... 156/212, 213, 216, 221, 156/227, 580, 581, 583.1; 100/70, 78, 85; 264/339; 425/398, 403; 493/408

[56] References Cited

U.S. PATENT DOCUMENTS

| 3,075,862 | 1/1963 | Hoyer | 156/216 |
|---|---|---|---|
| 4,323,406 | 4/1982 | Morello . | |
| 4,465,534 | 8/1984 | Zelkowitz . | |
| 4,617,081 | 10/1986 | Bleau et al. | 425/403 |
| 4,634,483 | 1/1987 | Spenger . | |
| 4,839,126 | 6/1989 | Griesdorn | 156/227 |

FOREIGN PATENT DOCUMENTS 1337903 8/1963 France .

Primary Examiner—Michael W. Ball
Assistant Examiner—Richard Crispino
Attorney, Agent, or Firm—W. G. Fasse; W. F. Fasse

[57] ABSTRACT

An apparatus for forming trim panels has upper and lower mold sections which perform a laminating and bonding between a substrate and a cover sheet while simultaneously cooperating with one or more folding devices to fold a sheet edge around a substrate rim to bond the sheet edge to the back of the substrate rim. Where prelaminated sheets are used, a brim is formed of the sheet edge and a substrate rim and the brim is first folded, after heating, through an angle of 90° and then through a further angle of 90° to complete the fold.

17 Claims, 18 Drawing Sheets

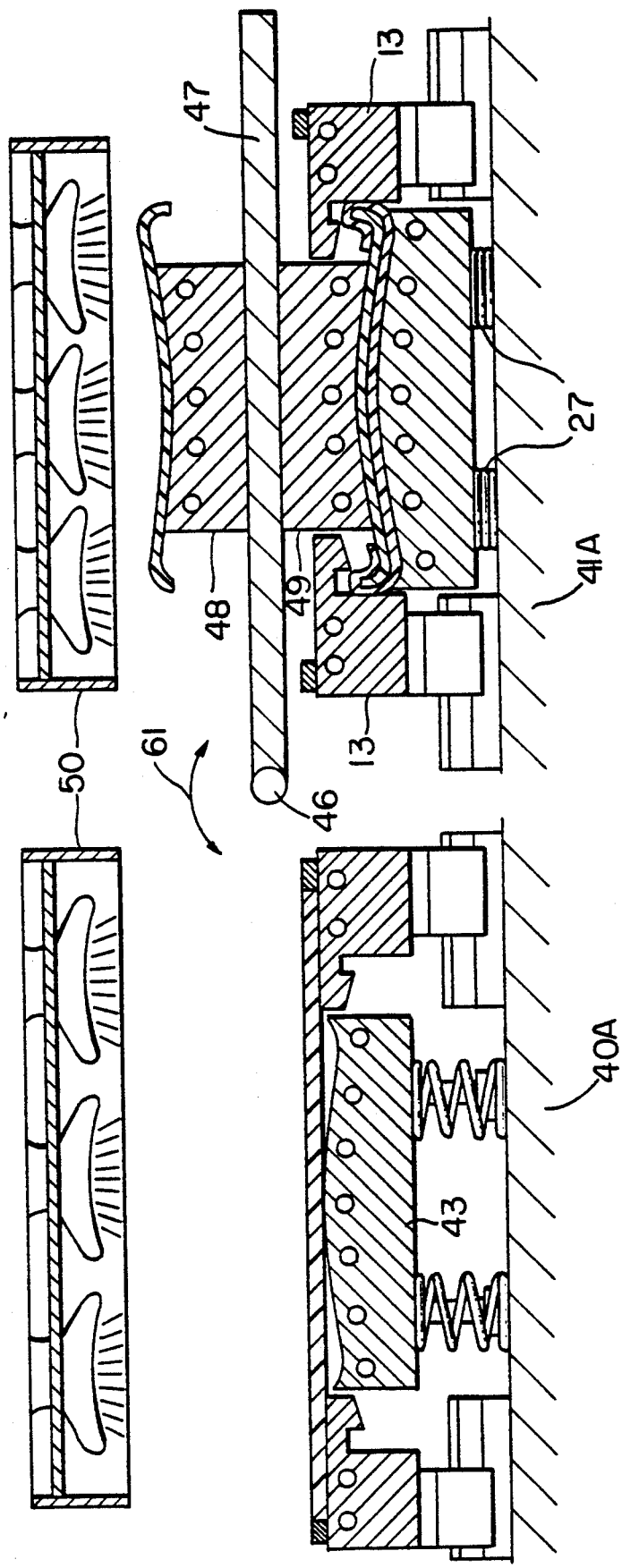

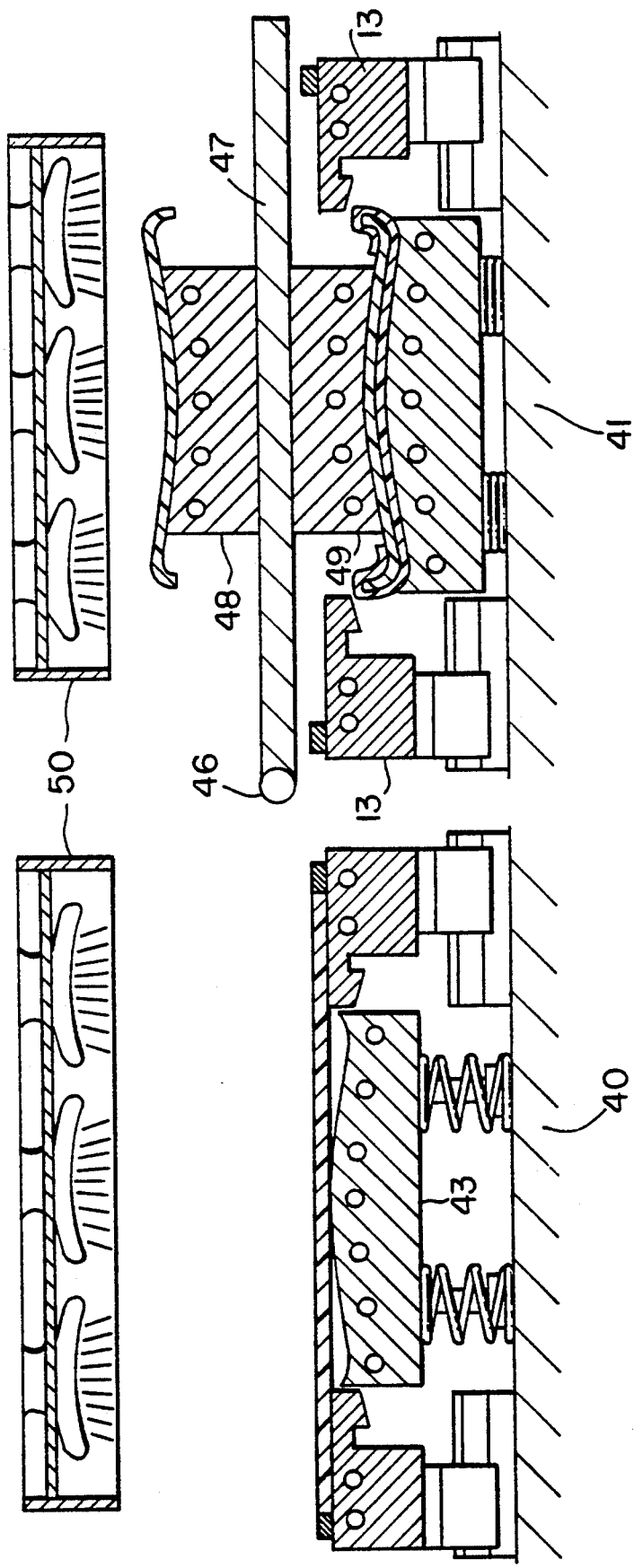

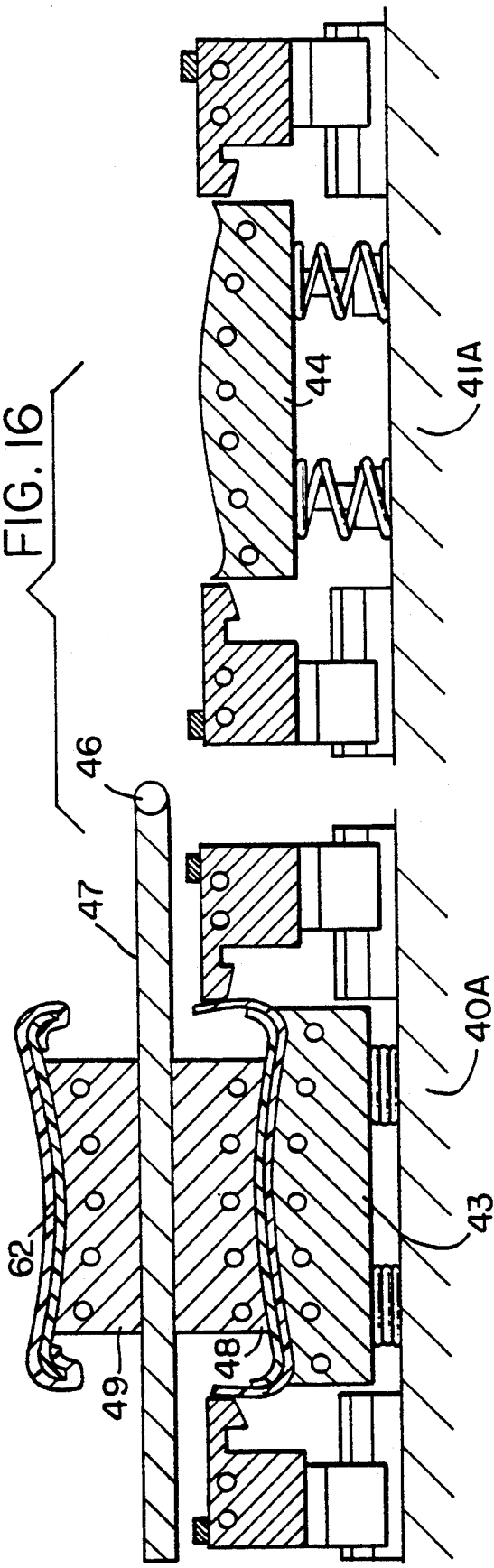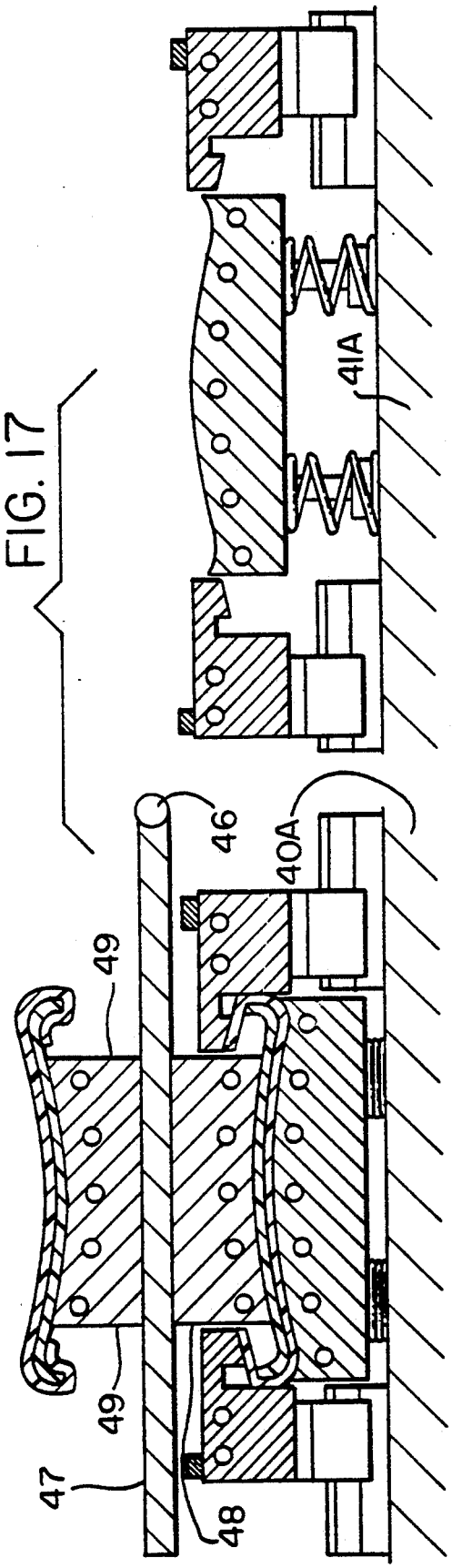

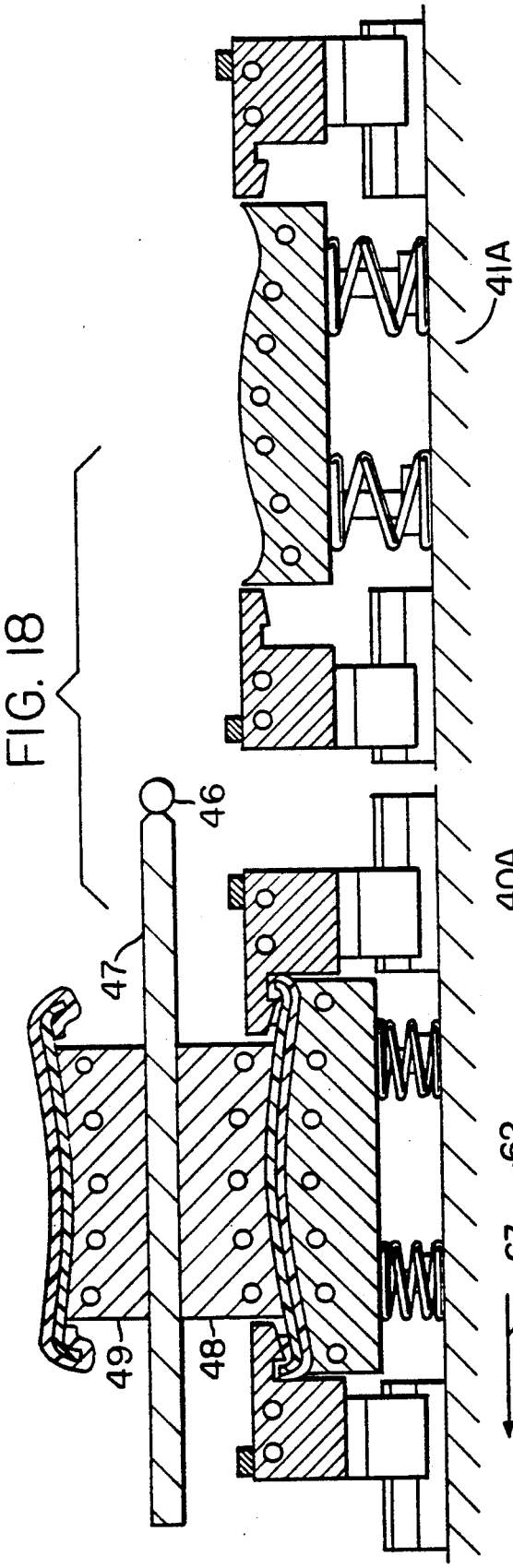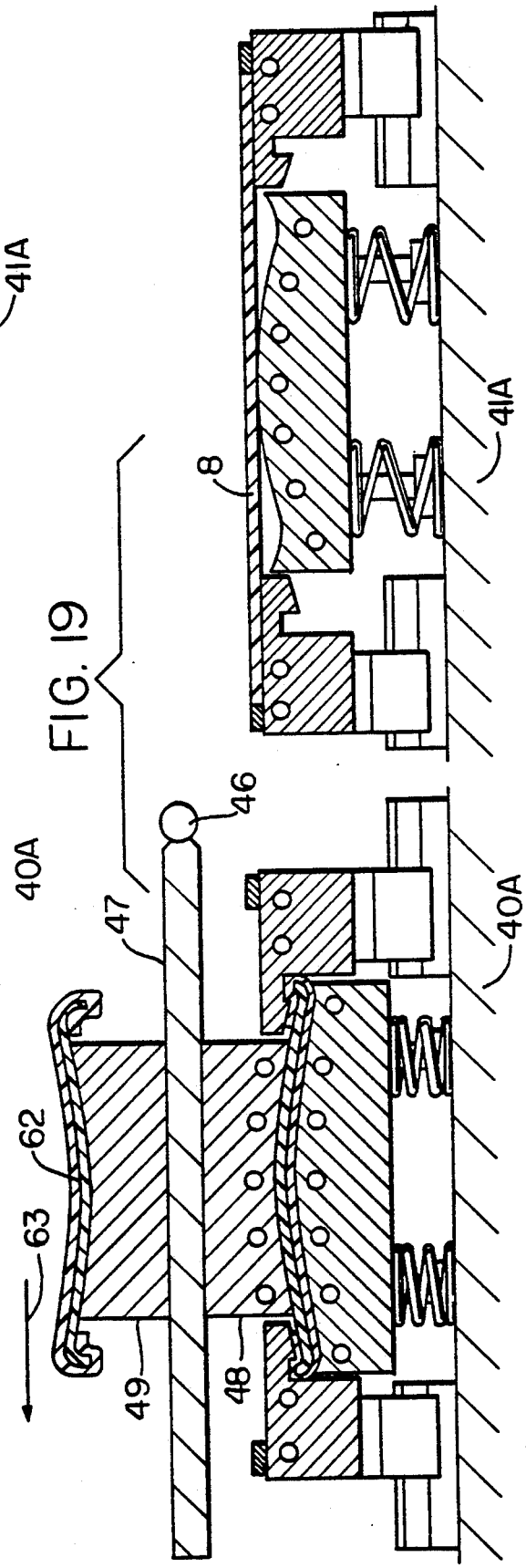

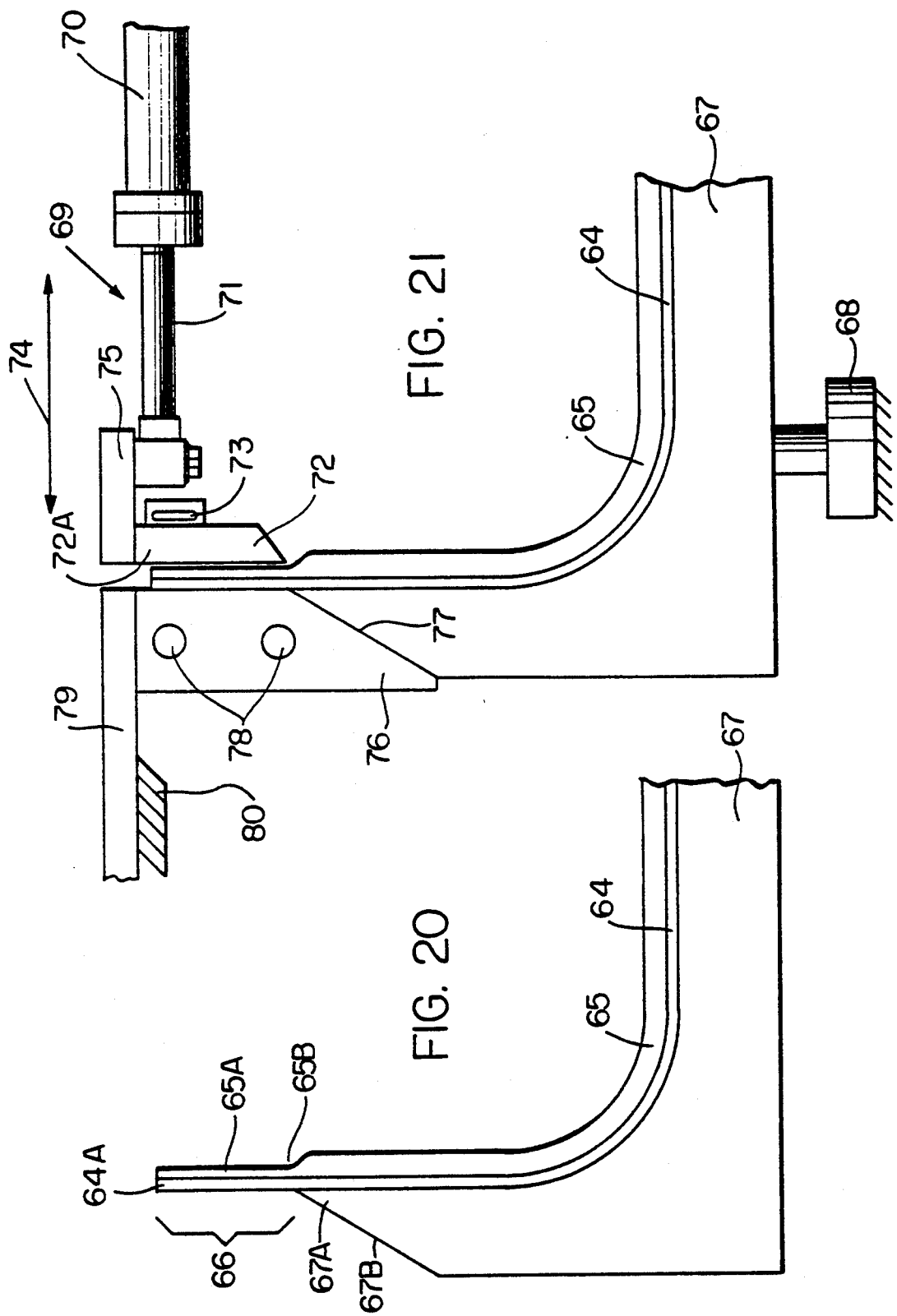

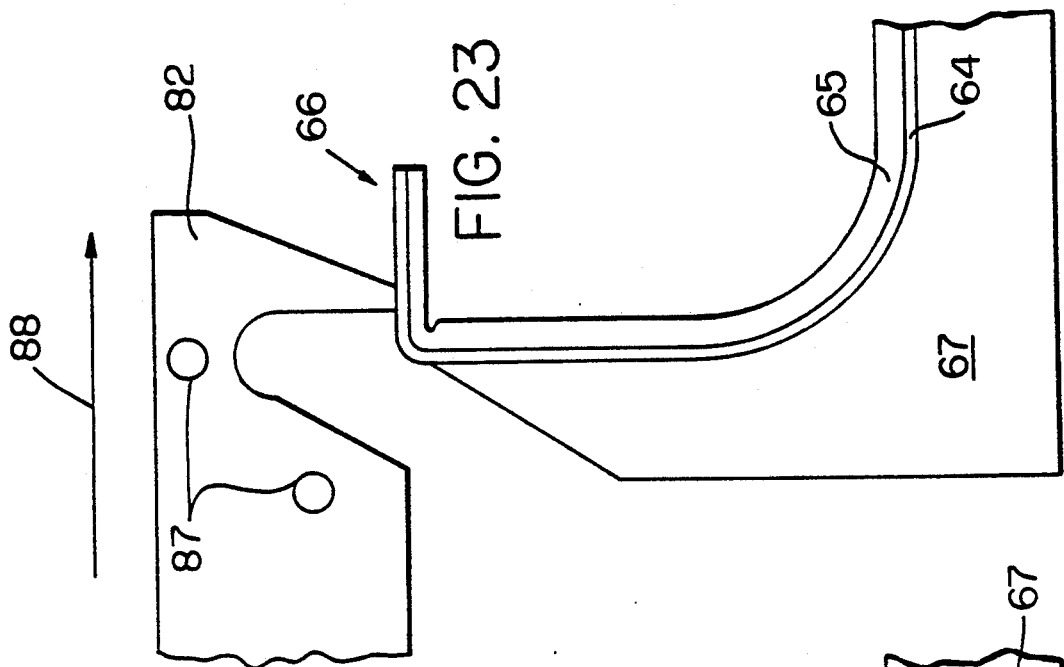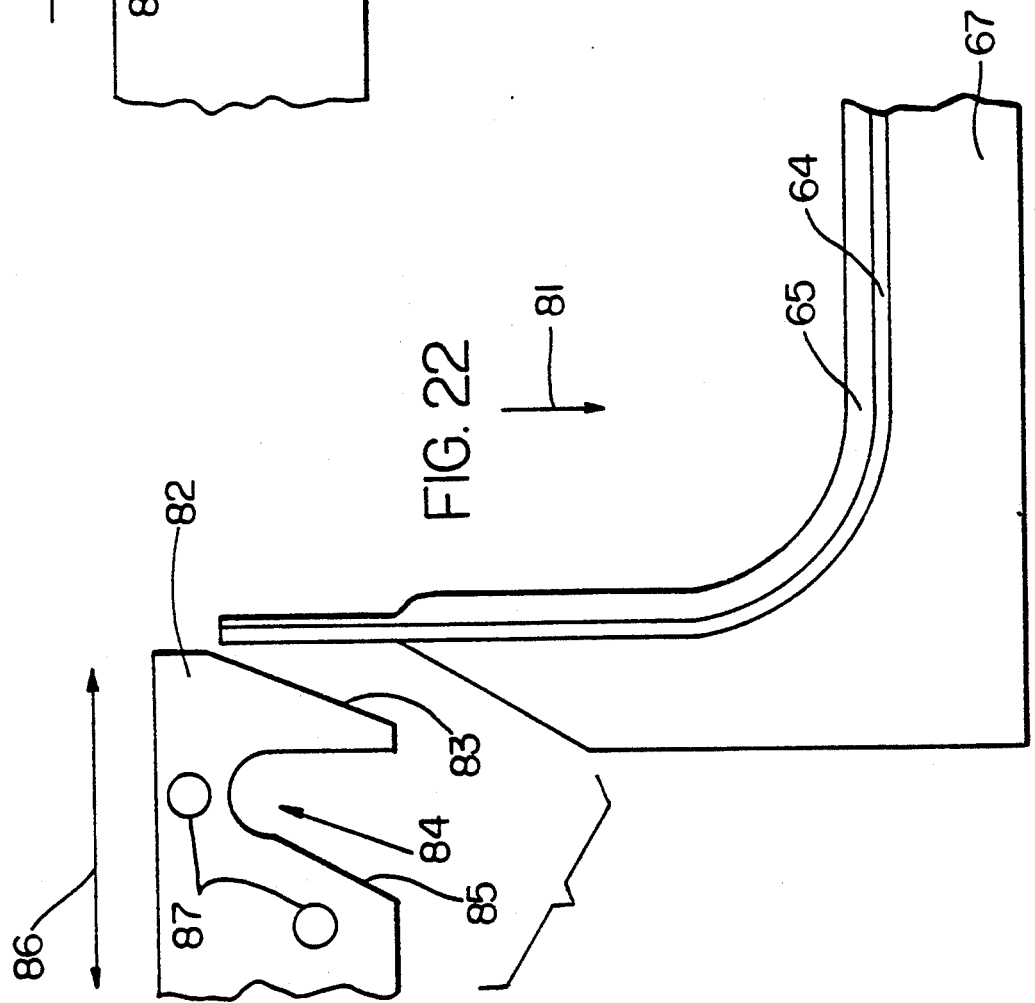

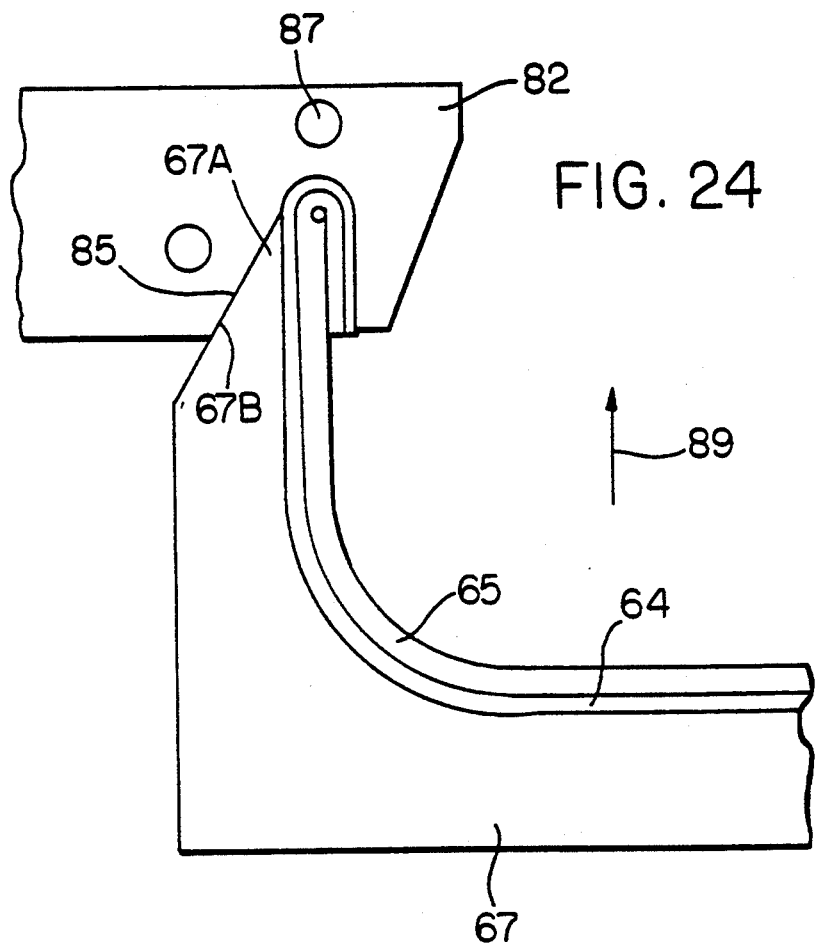

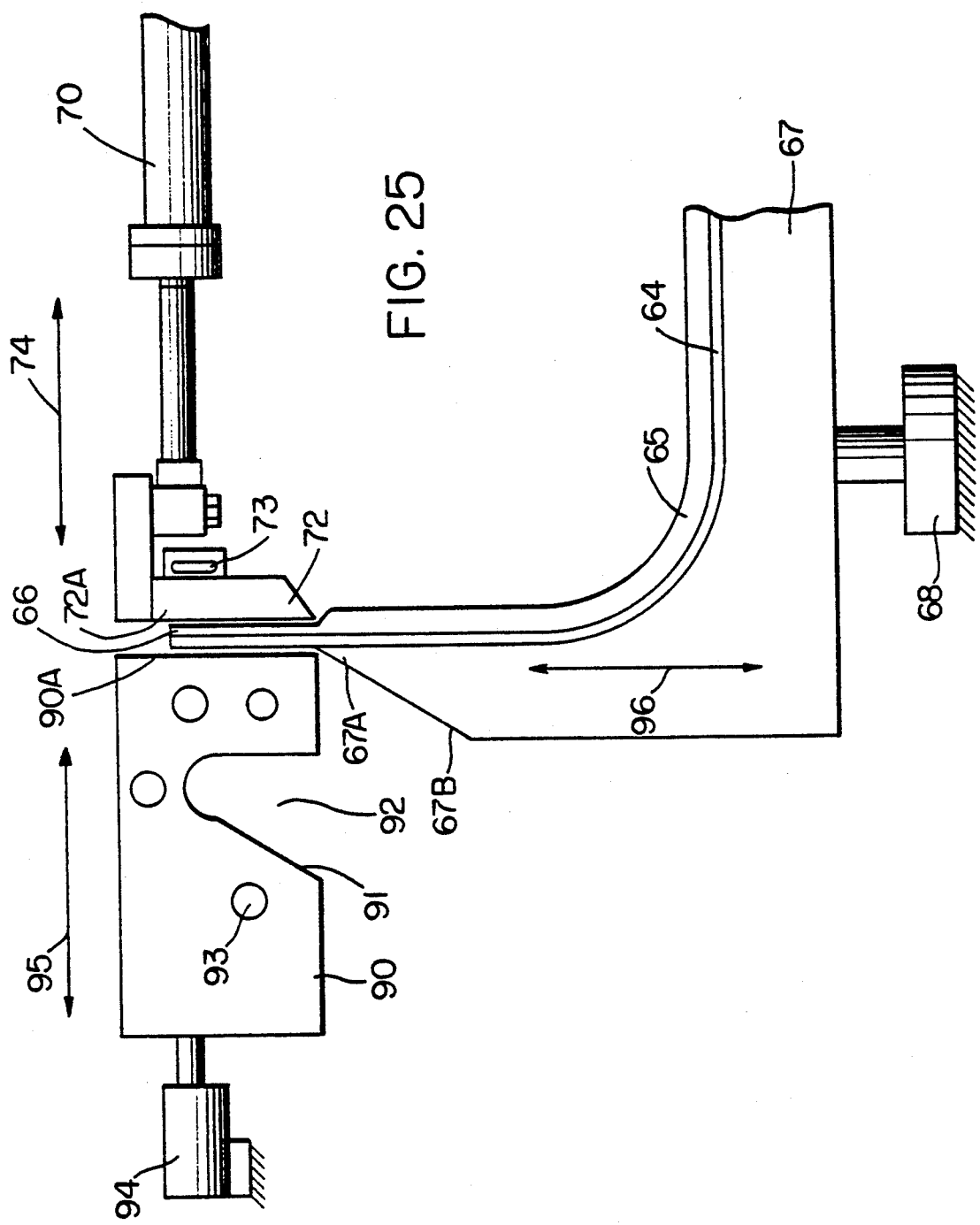

5,324,384

APPARATUS FOR LAMINATING A TRIM PANEL AND FOLDING A BRIM AROUND THE PANEL RIM

CROSS-REFERENCE TO RELATED APPLICATIONS

The present invention relates to U.S. Ser. No. 07/883,024 (Spengler et al.), filed on May 13, 1992, and to U.S. Ser. No. 07/883,025, (Spengler et al.) filed on May 13, 1992.

FIELD OF THE INVENTION

The invention relates to an apparatus for producing a trim panel having at least a substrate and a cover sheet laminated to the substrate with a sheet edge folded around a substrate rim onto a back of the substrate. The sheet edge and the substrate rim together form the panel brim that is to be folded.

BACKGROUND INFORMATION

Trim panels of this type are used, for example, to cover the inner surfaces of automobile doors. The trim panels conventionally comprise a substrate and a decor cover sheet that itself may comprise several plies laminated to each other. The cover sheet is then laminated to the substrate that forms a backing. Various materials are used for making the substrate, such as synthetic plastic materials, for example ABS, polypropylene, fiberboard, for example, made of wood fibers embedded in phenolic resin, and others, e.g. fiberglass panels, and the like. The cover sheets are made of decorative cloth or vinyl or similar materials preferably bonded to foam materials, especially polyether foam, polyethylene foam, and the like. The contents of the above mentioned U.S. patent application Ser. Nos. 07/883,025 (Spengler et al. filed in the U.S.A. on May 13, 1992, and 07/883,024 (Spengler et al. filed in the U.S.A. on May 13, 1992 are relevant to the formation of substrates and decorative cover sheets having more than one ply, for example, a decorative cover on a foam backing. Conventional adhesives are used in the laminating process which usually involves a heating of the substrate and a temperature control, more specifically, a cooling of the decor cover sheet or compound cover sheet comprising several plies to avoid damage to the decor material as described in more detail in the just mentioned two copending patent applications.

The problem of neatly trimming or edge folding the edges of the cover sheet has been a longstanding one. The above mentioned two U.S. patent applications try to avoid a folding operation altogether. However, depending on the type of materials used for specific purposes, and depending on the type of panel construction, an edge folding may be unavoidable.

U.S. Pat. No. 4,634,483 (Spengler), issued on Jan. 6, 1987 discloses a margin folding tool (41) which has a finger movable back and forth horizontally to merely push the cover sheet edge over the substrate rim. A tucking operation is not possible.

U.S. Pat. No. 4,465,534 (Zelkowitz), issued on Aug. 14, 1984, discloses an apparatus and method for upholstering a rigid chair shell. The shell forms the substrate and a decor material is rolled into a groove around the back of the chair shell. To hold the sheet edge in the groove, the sheet edge is rolled around a flexible tubular retaining element which is then rolled into a groove in the back of the chair shell.

U.S. Pat. No. 4,323,406 (Morello), issued on Apr. 6, 1982, discloses a method for covering panels involving a tucking operation into a specifically formed groove in the backing. The locking of the sheet edge in the groove is also accomplished by elastic means. A direct laminating and bonding of the sheet edge onto the back of the substrate cannot be accomplished by the teachings of Morello.

OBJECTS OF THE INVENTION

In view of the foregoing, it is the aim of the invention to achieve the folowing objects singly or in combination:

to combine into a single sequence of operations the laminating and bonding of a cover sheet, especially a compound multi-ply cover sheet, such as a decorative cover sheet onto a substrate and simultaneously edge folding and bonding the folded sheet edge onto the back of the substrate;

to laminate sheet edges of a prelaminated sheet onto the back of a substrate after folding the sheet edge around the rim of the substrate;

to provide a laminating and edge folding apparatus that permits the simultaneous laminating and bonding of the cover sheet to the substrate and of the sheet edge onto the back of the substrate; and to provide an apparatus capable of edge folding and edge laminating the sheet edge of a prelaminated panel onto the back of the panel substrate.

SUMMARY OF THE INVENTION

One embodiment of the method according to the invention is practiced by laminating a cover sheet to a substrate, whereby the cover sheet may be a compound sheet that itself comprises more than one ply. The laminating results in a prelaminated panel in which the cover sheet edge and the substrate rim together form a panel brim. The so prelaminated panel is held so that the panel brim protrudes from a tucking rim of a panel holding tool. The substrate rim forming part of the brim is then heated sufficiently for a laminating and bonding operation of the brim onto the back of the substrate. When the heating is sufficient the protruding panel brim is first folded through an angle of at least 90°, whereupon a tucking rim of a tool is moved into cooperation with a fold completion tool for completing a fold in which the panel brim is bonded and laminated to the back of the substrate. Preferably, the sheet edge should be cooled while the substrate brim is heated for protecting the cover sheet against damage by the heating of the substrate rim. Moreover, the portion of the substrate forming the substrate rim should be thinner than the rest of the substrate, so that the resulting panel brim is also thinner than the prelaminated panel. This feature facilitates forming the fold in the transition area where the brim merges into the prelaminated panel.

Another embodiment of the production method of the invention starts with precutting the substrate and cover sheet to such dimensions that the cover sheet has an area larger than the substrate, so that the sheet edge projects outside the substrate rim sufficiently to form the fold. The pre-cut sheet and substrate are then placed into or onto respective mold sections. The substrate is then heated and the temperature of the cover sheet is controlled sufficiently for a following laminating operation. A first mold member is then pressed against a second mold member for first laminating the cover sheet to the substrate, whereby the substrate rim is positioned at such a level that a folding device or member can subsequently reach behind the substrate rim. The heating and temperature control and the pressing operation takes place simultaneously. Then, the folding member is moved into a position behind the substrate rim, whereby this movement folds the sheet edge against the back of the substrate. Then a relative movement is performed between the folding member and the second mold member toward each other to apply a pressure for laminating the sheet edge against the substrate back. Then, the folding member and the second mold member are moved in such a way that the folding member can be brought out of the moving range of a mold member that holds the laminated trim panel. Finally, the mold members are moved apart for removing the trim panel.

The method of the first embodiment of the invention is preferably performed in an apparatus of the invention in which a tool, such as molding tool, has a tucking edge and holds the prelaminated panel so that the sheet edge and the substrate rim, which together form a brim, protrudes from the tucking edge. A drive, such as a piston cylinder drive, is connected to the first holding tool for moving the first holding tool in a first direction, for example, vertically up and down. A second tool that may comprise several components includes a heater for heating the substrate rim. If necessary, the sheet edge is simultaneously cooled to protect the decorative cover sheet against the heat resulting from the heating of the substrate rim. A second drive, such as a piston cylinder device, moves the second tool with its heater in a second direction. Preferably, the heater is moved horizontally. When the second tool moves horizontally, it first folds the brim through an angle of at least 90° toward the back of the substrate. The movement of the second tool which may include the heater, positions the second tool for cooperation with the tucking edge of the first tool. If now the first tool is driven in the first direction into engagement with the second tool, the fold is completed. Preferably, the second tool has a groove into which the first tool can move its tucking rim, thereby completing the folding operation.

The second embodiment of the present method is best performed by an apparatus according to the invention in which a first laminating mold section has a substrate holding surface area and a second laminating mold section including a central mold member, has a cover sheet supporting second surface area. A first drive, including one or more piston cylinder devices, for example, moves the first mold section and the central mold member of the second mold section relative to each other in a first direction, preferably a vertical direction for laminating the cover sheet to the substrate. The second mold section includes, in addition to the central mold member, at least one edge folding device mounted for movement in a second direction perpendicularly to the first direction, namely preferably horizontally. The edge folding device has a third surface area for supporting the sheet edge when the central mold member and the folding device are in a starting position for performing a laminating and edge folding operation. A second drive is provided for moving the edge folding device back and forth in the second direction when the central mold member is in a recessed position, whereby a folding member of the folding device can move behind the central mold member, thereby folding the sheet edge onto the back of the substrate around the rim of the substrate. The central mold member can now, driven by the first drive, move partly toward the first laminating mold section against the folding member, thereby pressing the sheet edge against the back of the substrate to complete the folding operation.

BRIEF DESCRIPTION OF THE DRAWINGS

In order that the invention may be clearly understood, it will now be described, by way of example, with reference to the accompanying drawings, wherein:

FIGS. 12 to 19 show sectional views of upper and lower mold sections as used in the apparatus of FIGS. 10 and 11 to illustrate a sequence of laminating and edge folding steps;

FIG. 20 shows a first tool, partly broken away, such as a lower mold section, for holding a prelaminated panel so that a panel brim protrudes from a tucking edge of the first tool;

FIG. 21 shows a side view of the tool of FIG. 20 cooperating with a counterholding member and with a heater forming a second tool;

FIG. 22 shows the tool of FIG. 20 in a lowered position ready for cooperation with a folding and tucking tool;

FIG. 23 shows the beginning of a folding operation of the brim of the panel;

FIG. 24 shows the completion of the folding operation;

FIG. 25 is a view similar to that of FIG. 21, however, modified by replacing a stationary counterholder by a movable counterholder which simultaneously functions as a tucking tool.

DETAILED DESCRIPTION OF PREFERRED EXAMPLE EMBODIMENTS AND OF THE BEST MODE OF THE INVENTION

Figure 1:
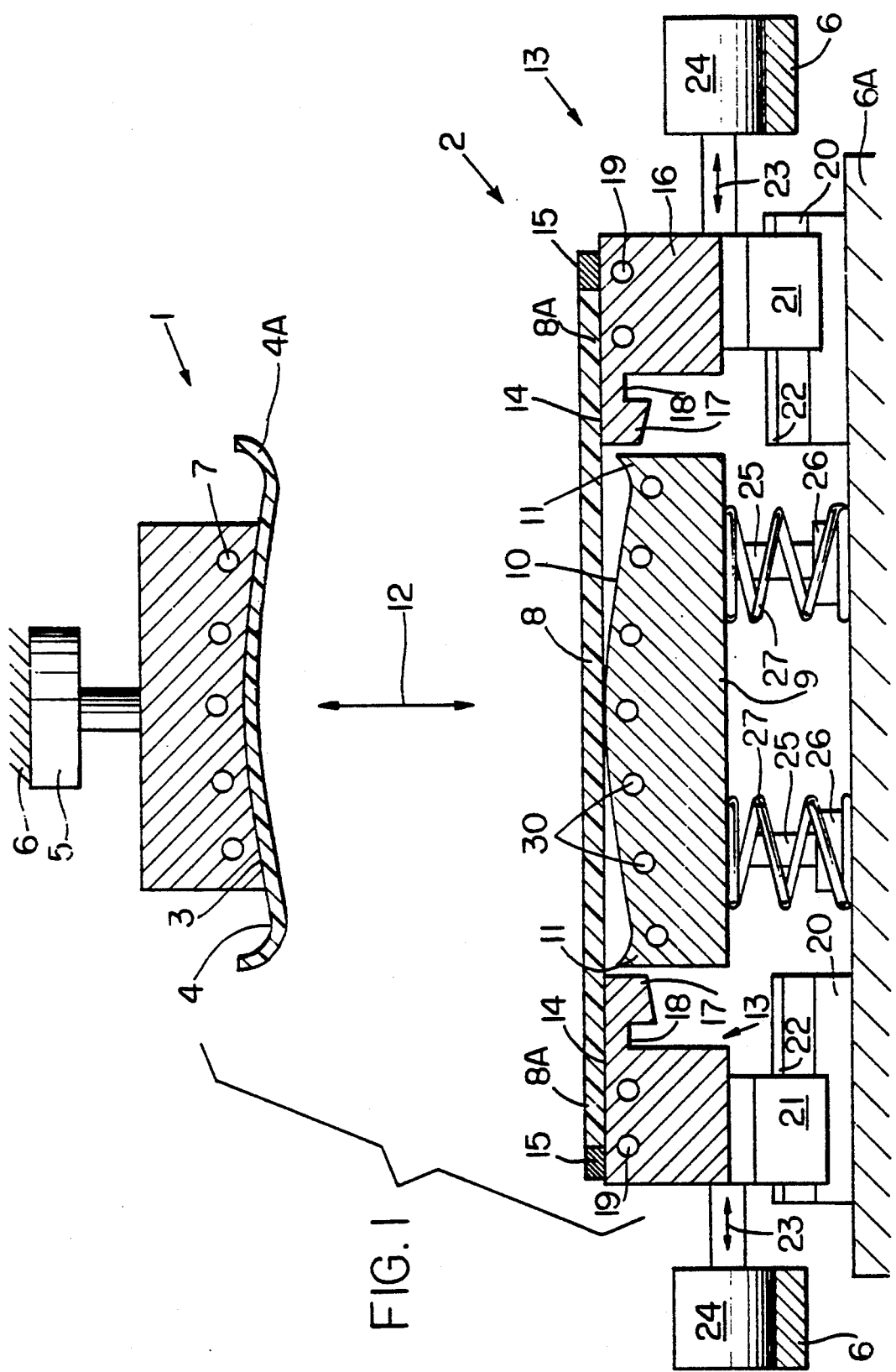
FIG. 1 is a sectional view through a laminating apparatus according to a first embodiment of the invention, showing a first upper laminating mold section and a second lower laminating mold section, including a central mold member and two folding devices.

FIG. 1 shows a first embodiment of an apparatus for producing a trim panel. The apparatus includes a first mold section 1 and a second mold section 2 forming, for example, upper and lower mold sections. The first mold section 1 comprises a surface area 3 for holding a substrate 4 by means of suction ducts, not shown in FIG. 1. The substrate has a premolded substrate rim 4A. The first mold section 1 is driven, for example, by a first drive in the form of a piston cylinder device 5 connected to a machine frame 6 merely shown symbolically. The first mold section 1 is provided with heating ducts 7 through which a heated fluid is pumped by conventional heating and fluid conveying devices not shown. A decor or cover sheet 8 has been loaded onto the lower mold section 2 which includes a central mold member 9 having a cover sheet supporting second surface area 10 and a tucking rim 11. With the aid of the first drive 5 it is possible to move the first mold section 1 and the central mold member 9 relative to each other in a first direction, for example, a vertical direction as indicated by the arrow 12.

The second mold section includes at least one or several folding devices 13 distributed around the central mold member 9. Each folding device 13 has a surface 14 forming a third surface for supporting the edge 8A of the cover sheet 8. The surfaces 14 are surrounded by stop members 15 which make sure that the sheet 8 is properly centered in the apparatus. Each folding device 13 has a body 16 with a folding finger 17 forming a tucking groove 18. Further, the bodies 16 are provided with ducts 19 for passing a temperature control fluid, preferably a cooling fluid through these ducts 19. Each body 16 is mounted on a slide back 20 by a slide block 21, which is guided along the back 20 by guide rails 22 for movement back and forth as indicated by the arrows 23 driven by second drive members such as piston cylinder devices 24 for performing a folding operation to be described below. The second drives 24 are mounted on the machine frame 6. The movement direction indicated by the arrows 23 is perpendicular to the first movement direction 12. In the shown embodiment this second direction extends horizontally.

The central mold member 9 is mounted, for example, on piston rods 25 of drive cylinders 26 mounted to a table 6A forming part of the machine frame 6. The piston rods 25 perform a guide function for guiding the central mold member 9 vertically up and down. In a simplified embodiment, the piston rods 25 may be merely guided in respective cylinders without the need for an application of hydraulic pressure provided that the drive 5 can perform a sufficient stroke.

The piston or guide rods 25 are surrounded by compression springs 27 which permit the central mold member 9 to yield in the vertical direction, whereby a force is stored in these compression springs 27, the use of which will be described below in connection with the function of the apparatus for applying a laminating pressure.

FIG. 1 shows that a premolded substrate 4 has been loaded onto the upper mold section 1 and a precut cover sheet 8 that may be a multi-ply sheet has been loaded onto the lower mold section 2. The sheet 8 has a sufficient size that its sheet edges 8A surround the substrate rim 4A sufficiently to permit the folding operation which will now be described with reference to FIGS. 2 to 9.

Figure 2:
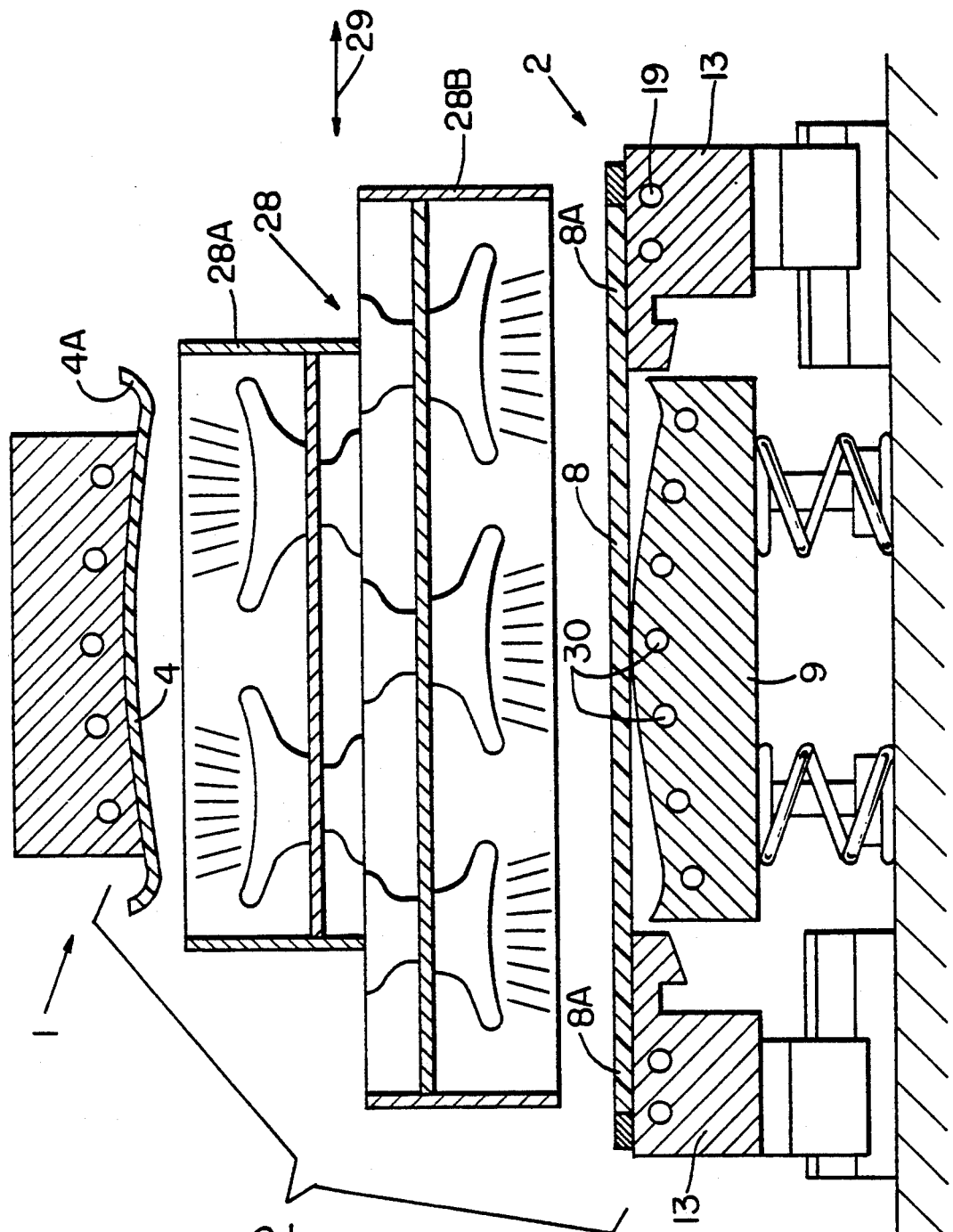
FIG. 2 is a view similar to that of FIG. 1, but showing additionally the position of heaters that can be moved into and out of the space between the upper and lower mold sections.

FIG. 2 shows heaters 28 that are movable horizontally into and out of the space between the upper mold section 1 and the lower mold section 2 back and forth as indicated by the arrow 29. The drive means for positioning the heaters 28 are not shown in FIG. 2. The heaters may, for example, be infrared heaters. The heater 28 has an upwardly effective section 28A for heating the substrate 4 and a downwardly effective section 28B for heating the cover sheet 8. When a sufficient heating has taken place, the heaters 28 will be withdrawn as indicated by the arrow 29. The central mold member 9 is provided with cooling ducts 30 for cooling the outerwardly facing decorative surface of the sheet 8 while its inwardly facing surface is heated for the lamination and bonding to the substrate 4. Similarly, the cooling ducts 19 in the folding devices 13 cool the outwardly facing surfaces of the sheet edges 8A.

Figure 3:
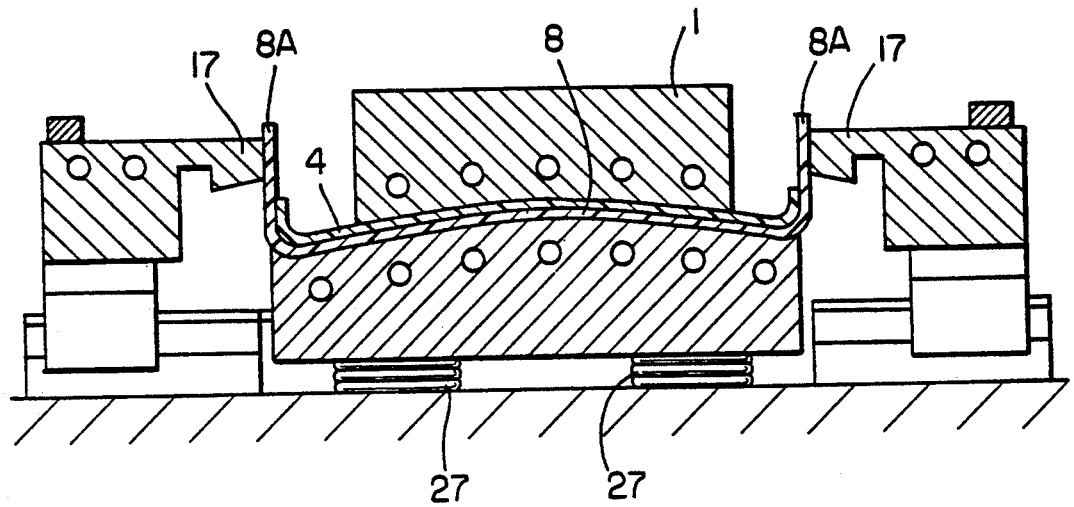
FIG. 3 shows the laminating step combined with a partial folding step of the sheet edge.

FIG. 3 illustrates the laminating process of the substrate 4 onto the back of the sheet 8 after the heaters 28 have been removed and the upper mold section 1 has been pressed against the central mold member 9, whereby the compression springs 27 are compressed as shown in FIG. 3. Simultaneously, the sheet edges 8A are folded to an angle of about 90° by the folding fingers 17. When the compression springs 27 have reached their limit, the bonding pressure will be applied for a sufficient length of time to laminate the cover sheet 8 to the substrate 4.

Figure 4:
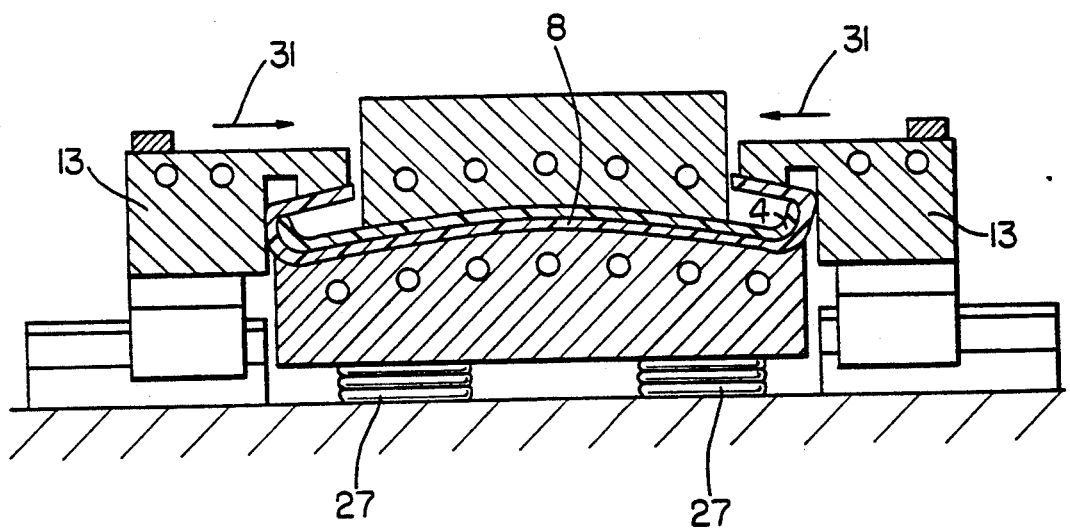
FIG. 4 shows the progress of the edge folding operation.

FIG. 4 illustrates the activation of the folding devices 13 by the drive devices 24 moving the folding devices 13 in the direction of the arrows 31. This movement enables the folding fingers 17 to fold the sheet edges further inwardly as shown in FIG. 4 into positions behind the substrate back.

Figure 5:
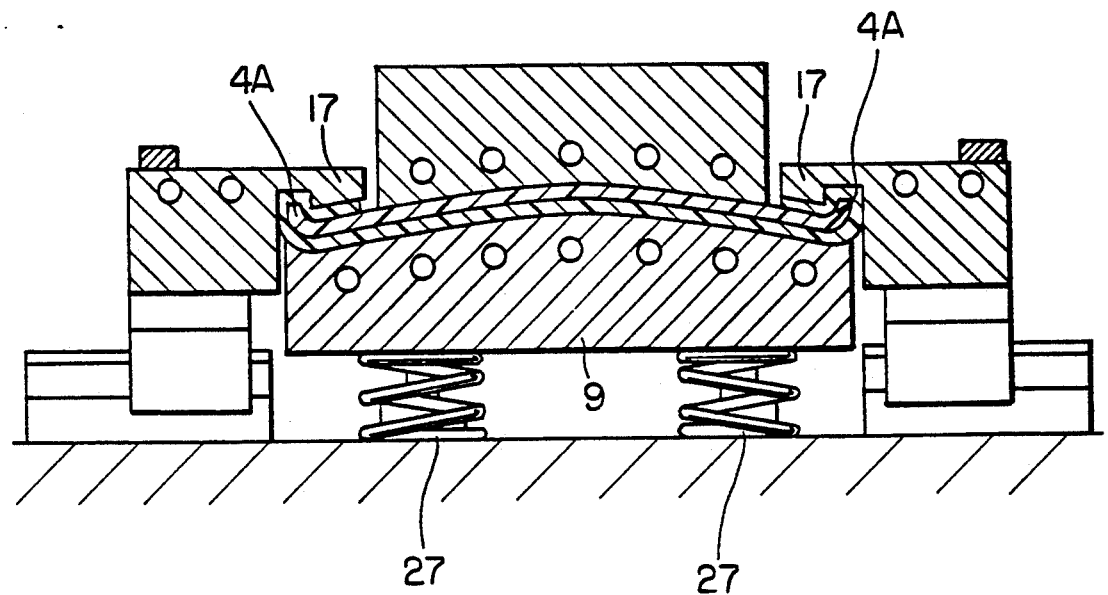
FIG. 5 shows the completion of the folding operation and laminating the sheet edge onto the back of the substrate.

FIG. 5 illustrates the release of the laminating pressure in the drive device 5, whereby the energy stored in the springs 27 lifts the central mold member sufficiently to tug the sheet edge around the substrate rims 4A by moving the tucking rim or rims 11 of the central mold member 9 into or toward the tucking grooves 18 of the folding fingers 17. The springs 27 are thereby partially relaxed as shown in FIG. 5. Simultaneously, the slanted or ramp forming sections of the folding fingers 17 press the sheet edge against the back surface of the substrate 4, thereby laminating and bonding the sheet edges against the substrate back. These ramps 17A are shaped to conform to the substrate back.

Figure 6:
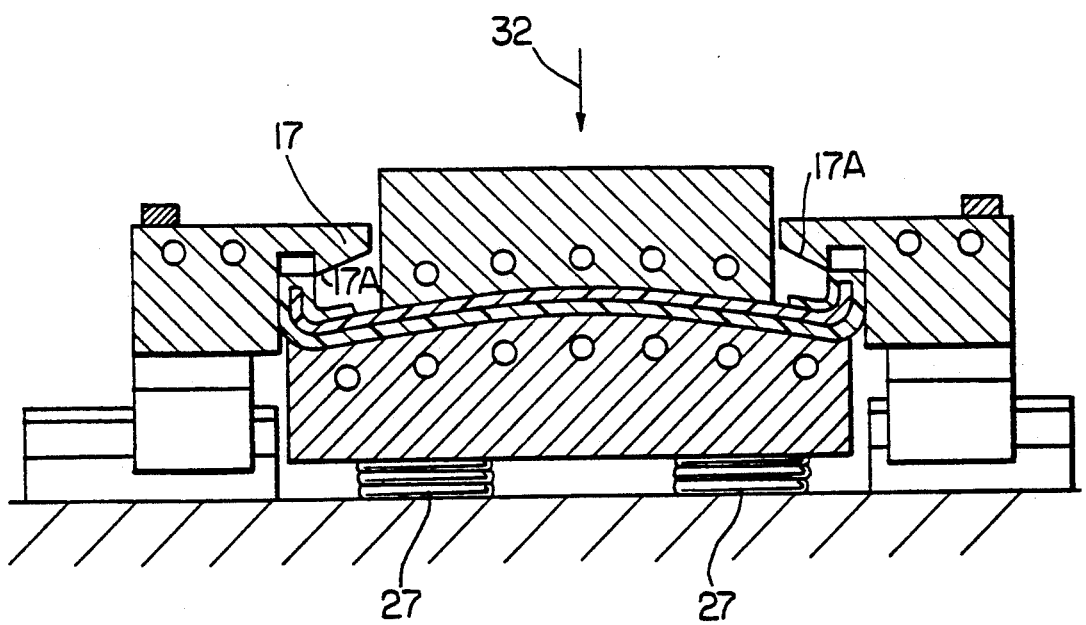
FIG. 6 shows the withdrawal of the central mold member to a position that clears the folding device for its subsequent withdrawal.
Figure 7:
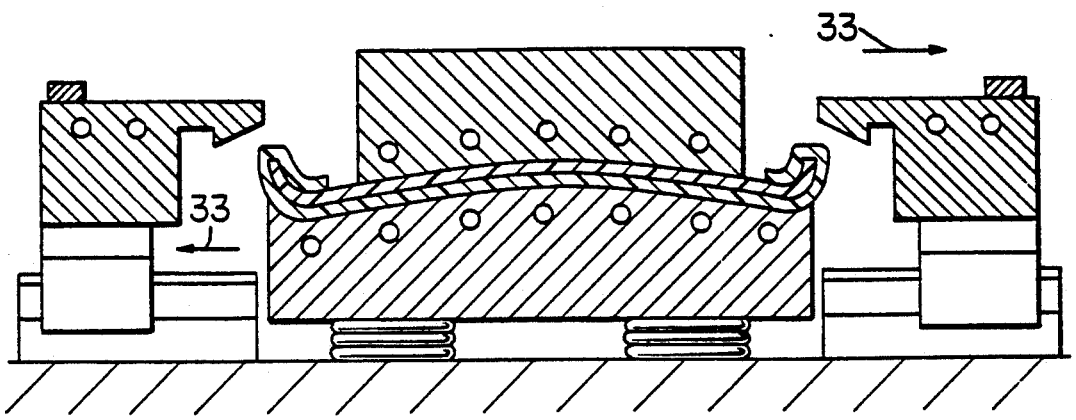
FIG. 7 shows the completion of the laminating and edge folding operation with the folding devices in their starting position.

FIG. 6 illustrates the activation of the drive 5 in a downward direction as indicated by the arrow 32 after a sufficient bonding time has elapsed to form the finished folded rim shown in FIG. 6. The downward movement is sufficient so that the ramps 17A of the folding fingers 17 can clear the finished folded rim as shown in FIG. 7 by the arrows 33 upon activation of the drives 24 in the outward direction.

Figure 8:
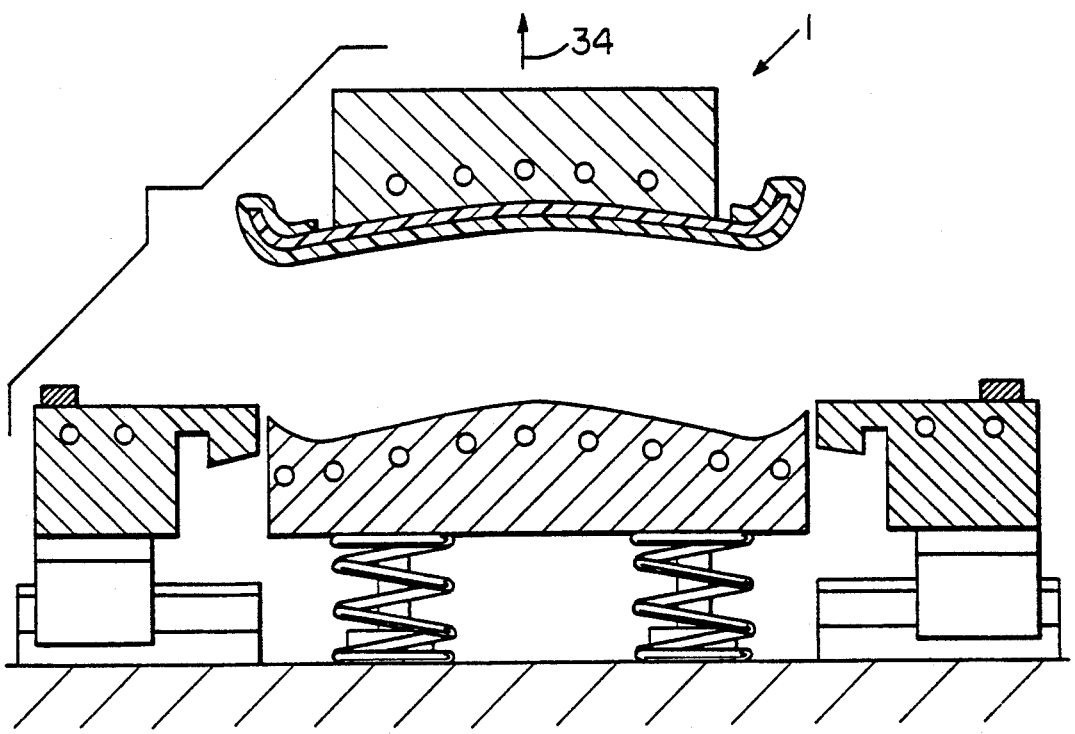
FIG. 8 shows the finished trim panel now carried by the upper mold section for removal.
Figure 9:
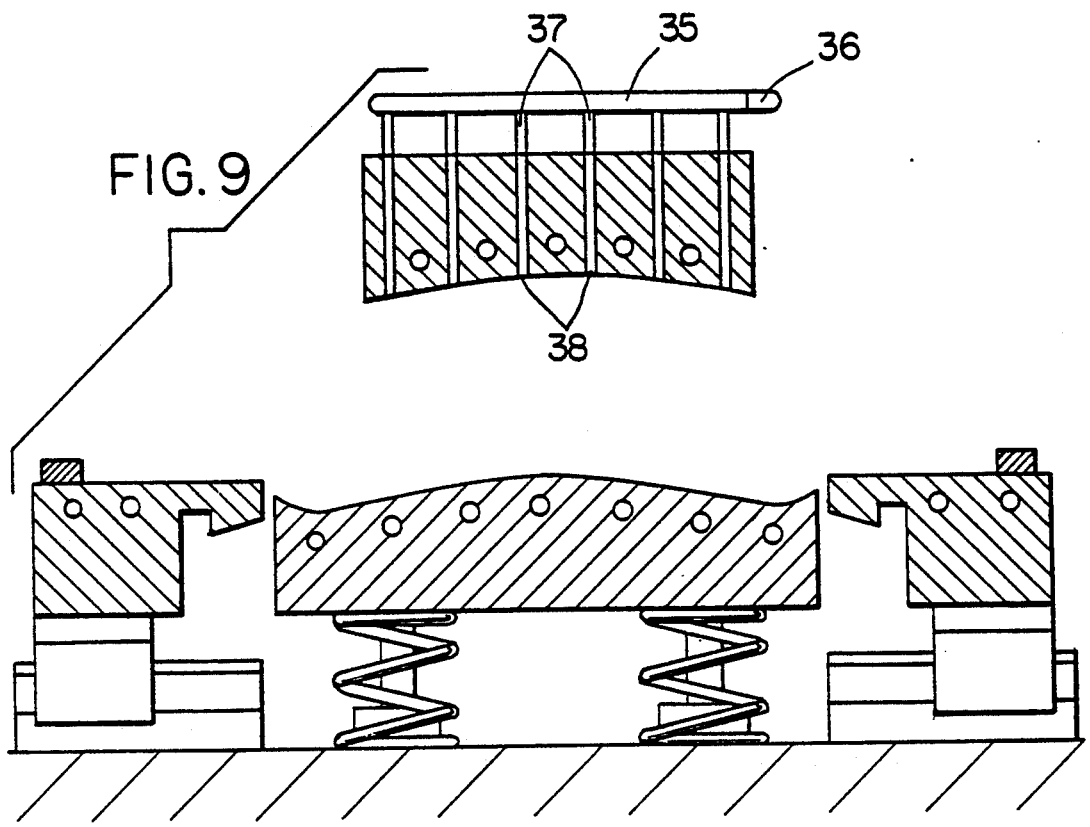
FIG. 9 is a view similar to FIG. 8, however with the finished trim panel removed and further illustrating suction ducts in the upper mold section for holding either the substrate or the finished panel.

FIG. 8 illustrates the lifting of the upper mold section 1 in the direction of the arrow 34 by the drive 5, whereby the finished trim panel is lifted along with the upper mold section since the suction is still effective. The upper mold section 1 is lifted sufficiently for conveniently removing the finished panel from the apparatus as shown in FIG. 9, making the apparatus ready for a renewed operational cycle that begins with the attachment of a substrate 4 to the upper mold section 1 and the placing of a cover sheet 8 on the lower mold section 2 as shown in FIG. 1. FIG. 9 further shows a manifold 35 connected to a suction source by a coupler 36. The suction source is not shown. The manifold 35 leads through ducts 37 to suction holes 38 which hold the substrate 4 as long as suction is applied.

Figure 10:
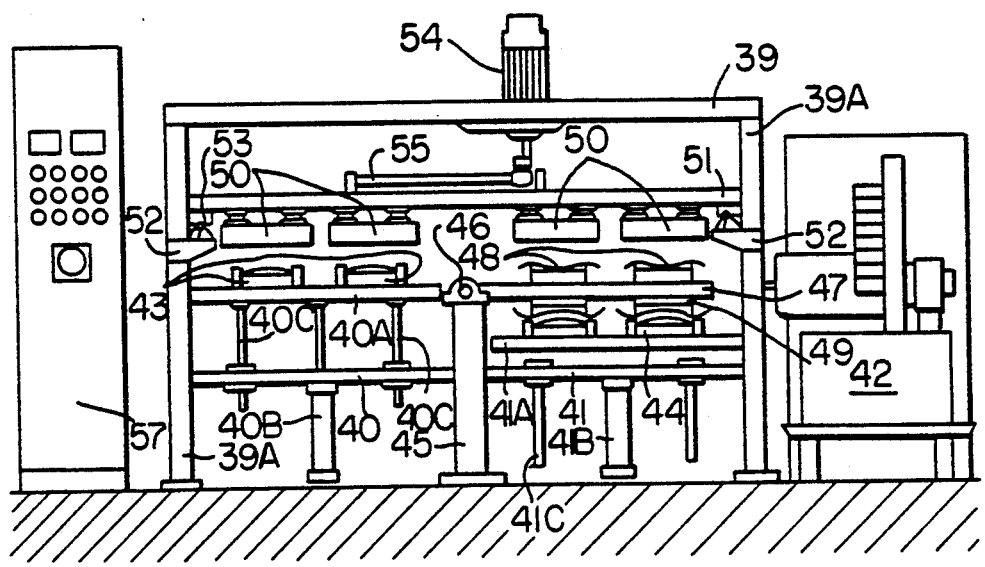
FIG. 10 is an elevational front view of a second embodiment of an apparatus according to the invention, permitting the use of a plurality of upper and lower mold sections in a sequence of operational steps.

FIG. 10 illustrates an embodiment for simultaneously handling several sets of upper and lower mold sections. A machine frame 39 has mounted therein a first table 40 and a second table 41. Each table carries a platform 40A and 41A respectively. Each platform is movable up and down by a piston cylinder device 40B or 41B. The platform 40A is shown in its up position and the platform 41A is shown in its down position. The piston cylinder devices are operated from a hydraulic section 42 of the apparatus which is of conventional construction. The left-hand platform 40A carries two sets of first laminating mold sections 43. The right-hand platform 41A carries two first or lower mold sections 44.

A central post 45 that may also be a carrier wall forms part of the machine frame. The tables 40 and 41 are conventionally secured to the post or carrier wall 45 and to the uprights 39A of the machine frame 39. A hinge 46 at the top of the post or carrier wall 45 secures a flip-flop table 47 to the post or carrier wall 45 for movement back and forth in a clockwise or counterclockwise direction for cooperation with one or the other set of the lower mold sections 43 or 44.

The flip-flop table 47 carries a first set of substrate holding mold sections 48 on one of its sides and a second set of substrate holding mold sections 49 on its opposite side. The mold sections 48 cooperate with the mold sections 43 and the mold sections 49 cooperate with the mold sections 44, depending on the position in which the flip-flop table 47 is held at the moment.

As shown in FIG. 10, the molding and folding operation takes place between the mold sections 44 and 49 while the mold sections 43 and 48 are being heated by heaters 50 supported by a carriage 51 movable back and forth in the machine frame 39 on rails 52 and rollers 53. The carriage 51 is driven by a motor 54 through a crank drive 55 or the like for shifting the heaters 50 back and forth as indicated by the arrows 56 in FIG. 11.

A control panel 57 forms part of the apparatus, but not of the invention. The panel may include a suction source.

Figure 11:
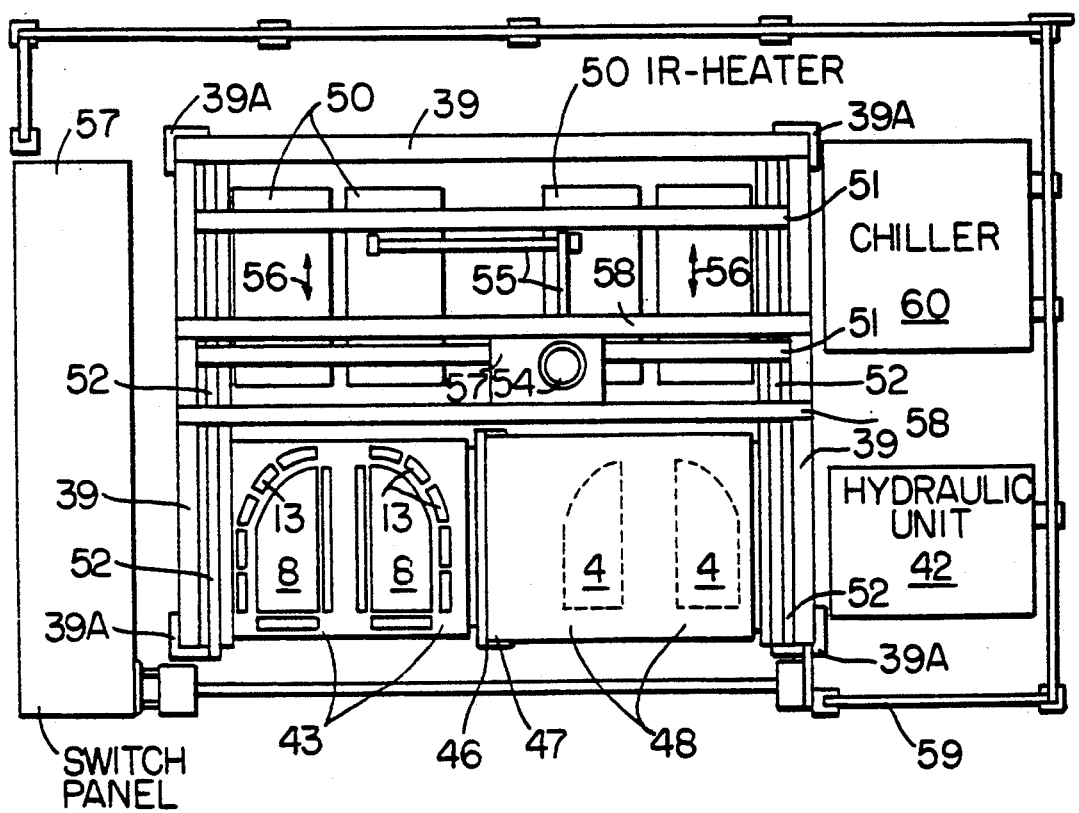
FIG. 11 is a top plan view of the apparatus according to FIG. 10.

Referring to FIG. 11, the previously used reference numbers, especially those used in FIG. 10 are also used in FIG. 11. The heaters 50 mounted to the carriage 51 are movable back and forth in the guide rails 52 as indicated by the arrows 56 through a motor 54 and a crank or similar drive 55. The motor 54 is mounted on a bracket 57 which in turn is secured to cross bars 58 mounted to the machine frame 39. A guard rail or fence 59 surrounds the machine. A temperature control device 60 includes heaters and cooling elements for the fluids passing through the above mentioned heating and cooling ducts.

The apparatus shown in FIGS. 10 and 11 operates in such a way that the flip-flop table or plate 47 hinged at 46 to the machine frame post 45 can alternately cooperate with one set or the other set of mold sections 43 or 44, whereby one set of mold sections is ready for loading and heating, while the other cooperates with one set of the mold sections on the flip-flop or carrier plate 47 in one horizontal position and vice versa with the carrier plate 47 in another horizontal position in the machine frame. During tilting the table or plate 47 through an angle of 180°, the heating devices are moved into the out of the way position shown in FIG. 11.

The operation of the apparatus shown in FIGS. 10 and 11 will now be described in more detail with reference to FIGS. 12 to 19, wherein components already described above with reference to FIG. 1 will not be described again.

Figure 12:
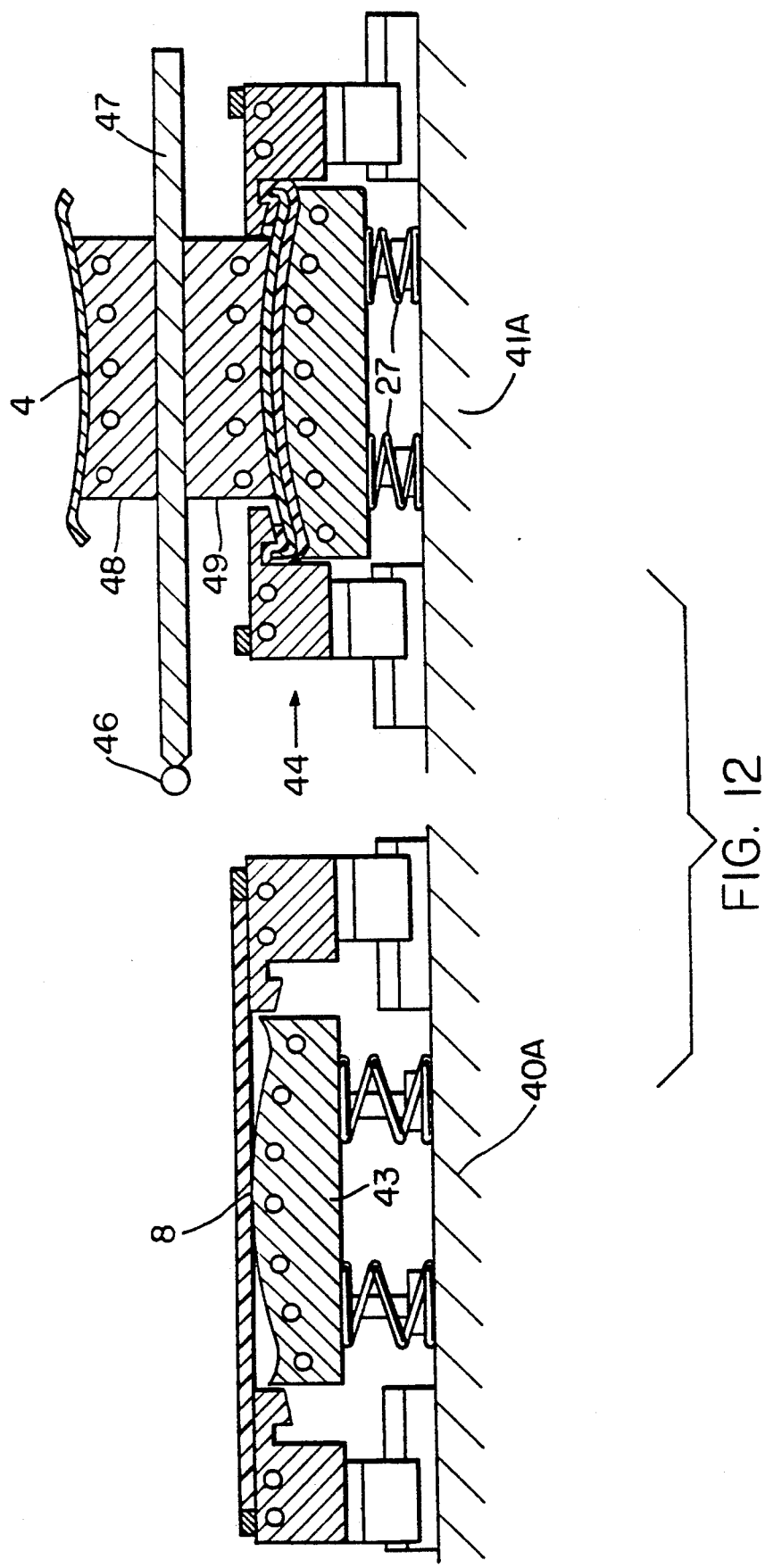

In FIG. 12, the mold section on the left-hand table 40 has been loaded with a cover sheet 8 while pressure is applied in the right-hand section of the apparatus corresponding to FIG. 5 described above. The springs exert a steady force for the laminating and bonding of the folded sheet edge to the back of the substrate. A substrate 4 has been loaded onto the mold section 48.

Figure 13:
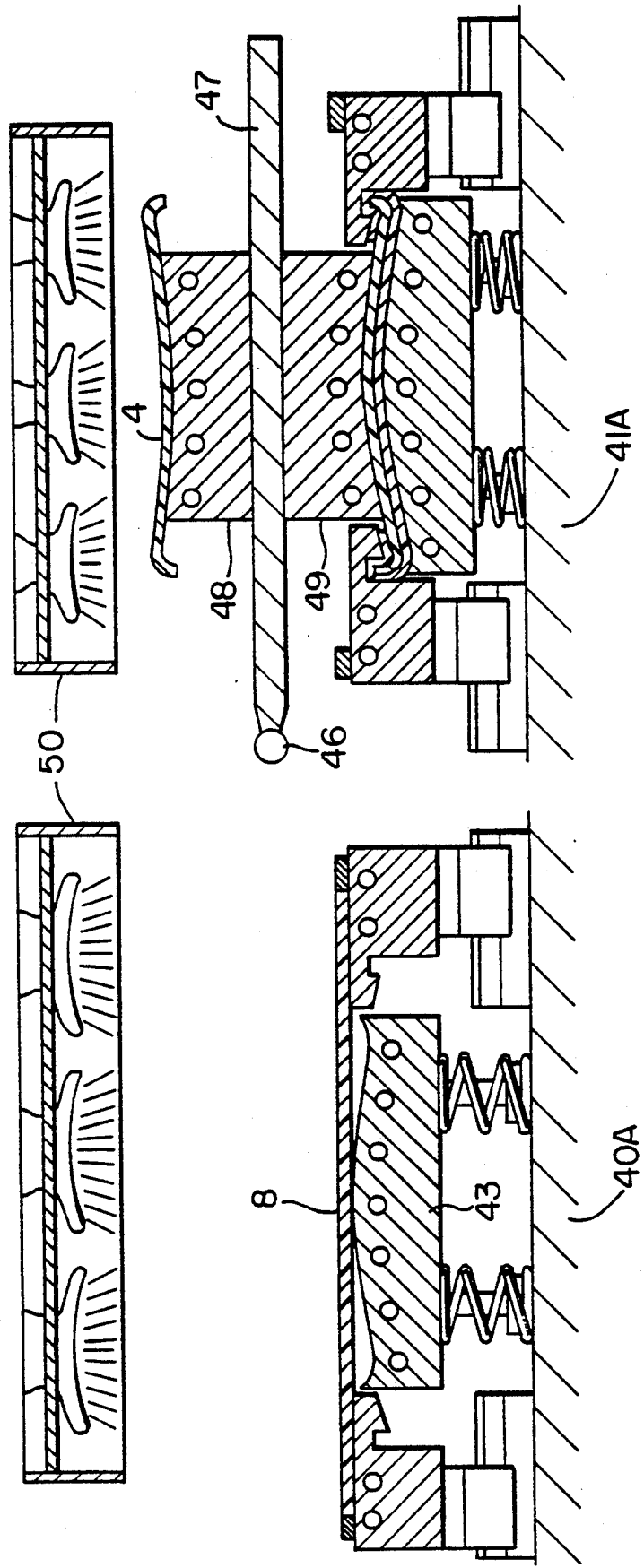

In FIG. 13 the heaters 50 have been brought into the position for heating the substrate 4 and the sheet 8. For this purpose, the table 40 would be in a higher position than shown in FIG. 13. Thus, these FIGS. are not intended to be to scale.

In FIG. 14, the heating continues, but the compression in the right-hand section is such that the folding devices 13 are ready to be moved out of the way corresponding to FIG. 6. However, in FIG. 14, the central mold member is lowered by its own piston cylinder device surrounded by the springs 27 which are fully compressed in this position. The flip-flop plate or table 47 is ready to be moved counterclockwise as indicated by the double arrow 61. The drive means for the plate 47 are not shown in detail since they are conventional. For example, an electric motor driving a sprocket connected to the hinge 46 through a sprocket chain could move alternately clockwise and counterclockwise within the rhythm of the production sequence as controlled by the control panel 57.

In FIG. 15 the folding devices 13 have been moved out of the way corresponding to FIG. 7. In FIG. 16 the flip-flop plate 47 has been moved through an angle of 180° around the hinge 46, whereby the formerly upwardly facing mold section 48 now faces downwardly and the formerly downwardly facing mold section 49 faces upwardly, so that the now finished trim panel 62 can be removed by an operator. The central mold section 43 will now be lowered to perform the initial folding of the sheet edge as described above with reference to FIG. 5. The right-hand side is ready for receiving a sheet to be placed manually by an operator. For this purpose the right-hand portion will be brought to its upper position by its respective drive. By this time the turntable has made its total 180° turn. The left lower table moves up until the lower mold is pushed down for cooperation with the mold section 48 against the force of the springs to perform the partial folding of the sheet edge as described with reference to FIG. 5. FIG. 17 shows the further folding step with the folding devices moved inwardly corresponding to FIG. 4. The right-hand portion is still ready to receive a new cover sheet.

In FIG. 18, the left-hand portion currently functions as described above with reference to FIG. 5, whereby low pressure bonding takes place over the laminating area between the substrate and the cover sheet and also for the edge laminating and bonding.

Incidentally, safety devices such as so-called light curtains, will be provided in the machine frame shown in FIGS. 10 and 11 to protect an operator who will be merely required to insert prelaminated substrates and precut cover sheets and remove finished trim panels.

In FIG. 19 the finished trim panel 62 is now removed as indicated by the arrow 63 while the laminating takes place in the lower left-hand portion as described above with reference to FIG. 5. A new precut sheet 8 will now be inserted into the right-hand portion of FIG. 19. The operation is repeated starting with FIG. 12.

FIGS. 20 to 26 show a further embodiment of the present apparatus for practicing the production method according to the invention. In this embodiment the cover sheet 64 and the substrate 65 do not need to have different dimensions. However, the cover sheet edge 64A and the substrate rim 65A together form a brim 66. Preferably, the substrate rim 65A is thinner than the substrate itself. Thus, a folding around the transition area 64B between the brim 66 and the thicker substrate section is facilitated. A first tool 67 which may form a mold section having its own drive 68, such as a piston cylinder drive shown in FIG. 21, is provided with a tucking rim 67A having a ramp 67B.

FIG. 21 shows the tool 67 of FIG. 20 in a cooperation position with a second tool 69 having its own drive 70 in the form of a piston cylinder device. A piston rod 71 carries a heating block 72 heated by a heater 73. The piston cylinder device 70 moves the heating block with its heater back and forth as indicated by the arrow 74. The upper end 72A of the heating block 72 is connected through a heat insulating piece 75 to the free end of the piston rod 71. The second tool also includes a counterholder 76 having itself a ramp 77 and cooling ducts 78. The counterholder 76 is mounted by a bracket 79 to a machine frame 80.

In FIG. 22, the heating has been completed, and the tool 67 has been moved down by its drive 68 as indicated by the double arrow 81 from the level shown in FIGS. 20 and 21 to a lower level shown in FIGS. 22 and 23. At the lower level, a folding tool 82 having a ramp 83 and a folding groove 84 with its own ramp 85 is movable back and forth horizontally as indicated by the arrow 86 by its own drive means not shown, but corresponding, for example, to the piston cylinder device 70 of FIG. 21. The folding tool 82 also has cooling ducts 87.

In FIG. 23, the folding tool 82 has been moved to the right as indicated by the arrow 88, whereby the brim 66 is folded through an angle of 90° as shown.

FIG. 24 shows how the tool 67 is moved up as indicated by the arrow 89 with the aid of its own drive 68 shown in FIG. 21. Thus, the tucking rim 67A moves into the groove 84, whereby the two ramps 67B and 85 cooperate in providing the sufficient pressure to complete the folding as shown in FIG. 24. The tool 67 is lowered after the folding has been completed, whereupon the finished trim panel can be removed from the holding surface of the tool 67.

Figure 26:
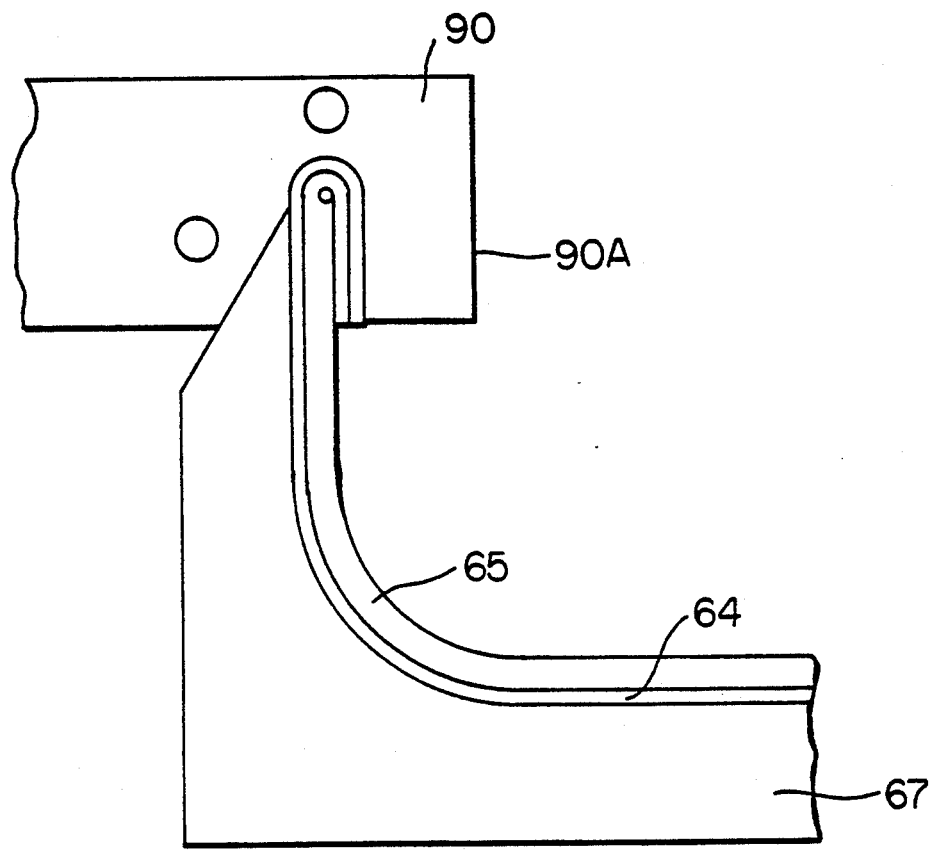
FIG. 26 is a view similar to that of FIG. 24, but showing the completion of a folding operation in the apparatus of FIG. 25.

FIGS. 25 and 26 illustrate a modified counterholder 90 cooperating with the tool 67 and the heater 72 as described above. The counter holder 90 has a counterholding surface 90A and a ramp 91 that cooperates with the ramp 67B in the completion of the folding as shown in FIG. 26. The ramp 91 leads into a tucking groove 92 that receives the tucking edge 67A of the tool 67 for the completion of the folding. The counter holder 90 is also provided with cooling ducts 93 and has its own drive 94 movable back and forth in the direction of the arrow 95. After the brim has been folded through 90° by the movement of the counterholder 90 to the right as indicated by the arrow 95, the tool 67 moves up as indicated by the arrow 96 to complete the fold. The drives 70 and 97 will be driven in synchronism toward and away from each other. The tool 67 may actually remain at the same level if the counterholder 90 is also movable vertically up and down.

Although the invention has been described with reference to specific example embodiments, it will be appreciated that it is intended to cover all modifications and equivalents within the scope of the appended claims.

What I claim is:

1. An apparatus for producing a trim panel having at least a substrate and a cover sheet laminated to said substrate with a sheet edge folded around a substrate rim onto a back of said substrate, comprising a first laminating mold section having a substrate holding first surface area, a second laminating mold section including a central mold member having a cover sheet supporting second surface area, first drive means for moving said first mold section and said central mold member relative to each other in a first direction for laminating by pressing said first mold section against said central mold member, said central mold member having means to yield in said first direction, said second mold section further comprising at least one edge folding means mounted for movement in a second direction extending perpendicularly to said first direction, said at least one edge folding means having a third surface area for supporting said sheet edge when said central mold member and said at least one edge folding means are in a starting position for a laminating and edge folding operation, and second drive means for moving said edge folding means back and forth in said second direction when said central mold member is moved into a recessed position relative to said third surface by said first drive means, whereby a folding member of said at least one edge folding means can move behind said central mold member thereby folding said sheet edge onto said back of said substrate around said rim of said substrate, whereby said central mold member can move partly toward said folding member to thereby press said sheet edge against said back of said substrate.

2. The apparatus of claim 1, wherein said means to yield further comprises elastically yielding support means for supporting said central mold member, said first drive means guiding said central mold member in said first direction, when said central mold member is driven by said first drive means, said support means storing a compression force for laminating.

3. The apparatus of claim 2, wherein said first drive means comprise a piston cylinder drive connected to the first mold section and piston cylinder drives including piston rods for guiding and driving said central mold member, and wherein said elastically yielding support means comprise compression springs surrounding said piston rods, said compression springs holding said central mold member in said starting position in the absence of a driving force applied by said piston cylinder drives.

4. The apparatus of claim 3, wherein in said starting position at least a portion of said second surface area of said central mold member is level with said third surface area of said edge folding means.

5. The apparatus of claim 1, further comprising guide means for guiding said at least one edge folding means in said second direction when said edge folding means are driven by said second drive means in said second direction.

6. The apparatus of claim 1, further comprising heater means for preheating said substrate and said cover sheet while said substrate is held by said upper mold section and said cover sheet is supported by said central mold member.

7. The apparatus of claim 1, wherein said first laminating mold section is arranged above said second laminating mold section, wherein said first direction is vertical and said second direction is horizontal.

8. The apparatus of claim 1, further comprising a frame, two sets of said first laminating mold section and two sets of said second laminating mold section arranged in said frame for movement of the first and second mold sections relative to each other, and heater means for heating substrates held by said first laminating mold sections and for heating cover sheets supported by said second laminating mold sections.

9. The apparatus of claim 8, further comprising a carrier plate for carrying said two sets of first mold sections, a machine frame member, hinge means for securing said carrier plate to said machine frame member so that said carrier plate is tiltable through an angle of at least 180°, wherein said two sets of said first laminating mold sections are secured to opposite sides of said carrier plate, and wherein said two sets of second laminating mold sections are so positioned that one set of second laminating mold sections is ready for loading while the other cooperates with one of said first mold sections on said carrier plate in one horizontal position and vice versa with said carrier plate in another horizontal position in said frame.

10. The apparatus of claim 9, further comprising heater means positioned for heating substrates and cover sheets on any one of said first and second laminating mold sections, and means for moving said heater back and forth.

11. The apparatus of claim 1, further comprising means connected to said first laminating mold sections, to said second laminating mold sections, and to said at least one edge folding means for individually controlling the temperature of said mold sections and of said folding means.

12. The apparatus of claim 1, wherein said folding member of said at least one edge folding means comprises a folding finger having said third surface on a first side thereof, a projection with a slanted surface on a second side of said folding finger opposite said first side, and a tucking groove below said first side of said folding finger.

13. The apparatus of claim 12, wherein said second surface area of said central mold member has a contour for shaping said trim panel, said central mold member comprising a tucking rim for cooperation with said tucking groove of said folding finger.

14. The apparatus of claim 12, wherein said folding finger comprises a sheet positioning rim on said first side of said folding finger for initially precisely positioning a precut sheet.

15. An apparatus for producing a trim panel having at least a substrate and a cover sheet laminated to said substrate with a cover sheet edge folded around a substrate rim onto a back of said substrate, comprising a laminating first mold member, a laminating second mold member, and at least one edge folding third member, said first mold member having a substrate holding first surface, said second mold member having a cover sheet supporting second surface, said third member having a cover sheet edge supporting third surface, said first surface having an area smaller than said substrate to be held, said substrate rim extends outside said first surface area, said second surface having an area larger than said substrate to be held so that a covered sheet edge extends outside said first surface area and outside said substrate to be held, said third surface extending outside said second surface and at a first level in common with at least a portion of said second surface when said three members are in a starting position relative to each other, drive means for moving said three members relative to each other for cooperation with each other in a laminating and edge folding operation, whereby in a first laminating step said substrate and said cover sheet are laminated to each other at a second level sufficiently below said first level for said third member to reach behind said back of said substrate, thereby folding said sheet edge around said substrate rim and against said back of said substrate, said drive means including means for pressing said substrate back against said third member for laminating said sheet edge against said substrate back.

16. The apparatus of claim 15, further comprising temperature control means for individually controlling the temperature of said three members.

17. The apparatus of claim 15, wherein said drive means comprise first drive means for moving said first and second mold members vertically relative to each other and second drive means for moving said third member horizontally, said first drive means including a power drive connected to said first mold member and compression springs supporting said second mold member, whereby an expansion force is stored in said compression springs when said power drive moves said first and second members in a spring compressing direction, said expansion force providing a laminating pressure when said power drive moves in a spring release direction.

* * * * *